United States Patent
Lee et al.

(10) Patent No.: US 12,022,052 B2
(45) Date of Patent: Jun. 25, 2024

(54) METHOD AND APPARATUS FOR 3D RECONSTRUCTION OF PLANES PERPENDICULAR TO GROUND

(71) Applicant: SAMSUNG ELECTRONICS CO., LTD., Suwon-si (KR)

(72) Inventors: Jaewoo Lee, Hwaseong-si (KR); Sangjun Lee, Suwon-si (KR); Wonju Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 458 days.

(21) Appl. No.: 17/344,095

(22) Filed: Jun. 10, 2021

(65) Prior Publication Data
US 2022/0070433 A1 Mar. 3, 2022

(30) Foreign Application Priority Data
Aug. 25, 2020 (KR) ........................ 10-2020-0107405

(51) Int. Cl.
*G06T 7/73* (2017.01)
*G06T 7/55* (2017.01)
(Continued)

(52) U.S. Cl.
CPC ............ *H04N 13/221* (2018.05); *G06T 7/55* (2017.01); *G06T 7/579* (2017.01); *G06T 7/73* (2017.01);
(Continued)

(58) Field of Classification Search
CPC .. G06T 7/55; G06T 7/80; G06T 17/00; G06T 15/04; G06T 15/20; G06T 15/205;
(Continued)

(56) References Cited

U.S. PATENT DOCUMENTS

| 7,268,803 B1 * | 9/2007 | Murata ................. H04N 13/10 348/E13.064 |
| 8,655,052 B2 | 2/2014 | Spooner et al. |

(Continued)

FOREIGN PATENT DOCUMENTS

| CN | 106952341 A | 7/2017 |
| KR | 100755450 | 9/2007 |

(Continued)

OTHER PUBLICATIONS

Z.-Q. Luo, W.-K. Ma, A. M.-C. So, Y. Ye, and S. Zhang, "Semidefinite relaxation of quadratic optimization problems," IEEE Signal Process. Mag., vol. 27, No. 3, pp. 20-34, May 2010. (Year: 2010).*

(Continued)

*Primary Examiner* — Ian L Lemieux
(74) *Attorney, Agent, or Firm* — Fish & Richardson P.C.

(57) ABSTRACT

An apparatus for three-dimension (3D) reconstruction includes; an event trigger module that determines whether to perform a 3D reconstruction, a motion estimation module than obtains motion information, and a reconstruction module that receives a first front image having a first view point and a second front image having a second view point, and obtains 3D coordinate values of a camera coordinate system based on the first front image and the second front image. Here, each of the first front image and the second front image includes planes, and each of the planes is perpendicular to the ground and includes feature points.

20 Claims, 13 Drawing Sheets

(51) Int. Cl.
  *G06T 7/579* (2017.01)
  *G06V 10/40* (2022.01)
  *H04N 13/221* (2018.01)
(52) U.S. Cl.
  CPC .............. *G06T 7/74* (2017.01); *G06V 10/40* (2022.01); *G06T 2207/10028* (2013.01)
(58) Field of Classification Search
  CPC ... G06T 19/003; G06T 19/20; G06T 2200/04; G06T 2207/10004; G06T 2207/10012; G06T 2207/20101; G06T 2207/20164; G06T 2207/30201; G06T 7/32; G06T 7/543; G06T 7/564; G06T 7/593; G06T 7/73; G06T 7/74; G06T 7/75; G06T 7/90; G06T 17/20; G06T 2207/10028; G06T 2207/30204; G06T 2207/30244; G06T 2207/30256; G06T 7/33; G06T 7/536; G06T 7/579; H04N 13/106; H04N 13/156; H04N 13/204; H04N 13/246; H04N 2213/001; H04N 23/62; H04N 5/2628; H04N 13/10; H04N 13/221; H04N 13/254; H04N 23/60; G06V 10/40; G06F 16/444
  See application file for complete search history.

(56) References Cited

U.S. PATENT DOCUMENTS

| | | | |
|---|---|---|---|
| 8,896,665 B2 | 11/2014 | Kim et al. | |
| 8,982,363 B2 | 3/2015 | Goyal et al. | |
| 9,990,760 B2 | 6/2018 | Aguilera Perez et al. | |
| 10,482,679 B2 | 11/2019 | Bell et al. | |
| 2005/0128196 A1* | 6/2005 | Popescu | G01S 17/89 345/420 |
| 2015/0077014 A1 | 3/2015 | Ng et al. | |
| 2017/0261315 A1* | 9/2017 | Yamaguchi | G08G 1/16 |
| 2018/0357791 A1* | 12/2018 | Dworakowski | G06T 7/74 |
| 2019/0259178 A1* | 8/2019 | Hafner | G06T 7/80 |
| 2022/0051018 A1* | 2/2022 | Prasso | G06V 20/20 |
| 2023/0252667 A1* | 8/2023 | Xu | G06V 10/462 382/100 |

FOREIGN PATENT DOCUMENTS

| | | |
|---|---|---|
| KR | 101195942 | 10/2012 |
| KR | 101489468 | 2/2015 |
| KR | 101613721 | 4/2016 |
| KR | 101869605 | 6/2018 |
| KR | 102060113 | 12/2019 |

OTHER PUBLICATIONS

Zhao, Ji. "An Efficient Solution to Non-Minimal Case Essential Matrix Estimation," version 2 https://arxiv.org/abs/1903.09067v2 (Year: 2019).*
Yasutaka Furukawa, et al., Reconstructing Building Interiors From Images, 2009 IEEE Internation Conference on Computer Vision, IEEE, Kyoto, Japan.

* cited by examiner

FIG. 7

| Method | Distance | σ | | | | | | | | |
|---|---|---|---|---|---|---|---|---|---|---|
| | | 0.1 | 0.2 | 0.3 | 0.5 | 0.7 | 1.0 | 1.5 | 2.0 | 3.0 |
| Naive triangulation | 8m | 0.0157 | 0.0308 | 0.0466 | 0.0780 | 0.1104 | 0.1560 | 0.2366 | 0.3182 | 0.4748 |
| Planar reconstruction | | 0.0037 | 0.0073 | 0.0114 | 0.0179 | 0.0265 | 0.0377 | 0.0580 | 0.0773 | 0.1195 |
| Proposed method (K=2) | | 0.0032 | 0.0063 | 0.0098 | 0.0152 | 0.224 | 0.0324 | 0.0512 | 0.0706 | 0.1105 |
| Proposed method (K=4) | | 0.0030 | 0.0058 | 0.0091 | 0.0141 | 0.0205 | 0.0301 | 0.0481 | 0.0679 | 0.1063 |
| Naive triangulation | 10m | 0.0301 | 0.0607 | 0.0903 | 0.1524 | 0.2106 | 0.3010 | 0.4554 | 0.6102 | 0.9385 |
| Planar reconstruction | | 0.0069 | 0.0139 | 0.0210 | 0.0347 | 0.0493 | 0.0702 | 0.1088 | 0.1519 | 0.2522 |
| Proposed method (K=2) | | 0.0060 | 0.0116 | 0.0183 | 0.0300 | 0.0430 | 0.0623 | 0.0994 | 0.1408 | 0.2401 |
| Proposed method (K=4) | | 0.0056 | 0.0109 | 0.0172 | 0.0280 | 0.0401 | 0.0606 | 0.0958 | 0.1380 | 0.2374 |

FIG. 11

| Method | σ = 0.3 | | | σ = 0.5 | | | σ = 0.7 | | | σ = 1.0 | | |
|---|---|---|---|---|---|---|---|---|---|---|---|---|
| | Pitch | Roll | Hieght | Pitch | Roll | Height | Pitch | Roll | Height | Pitch | Roll | Height |
| | | | | | | With camera-motion noise | | | | | | |
| Naive triangulation | 0.9829 | 0.2859 | 0.1413 | 1.3705 | 0.4759 | 0.1973 | 2.4338 | 0.9065 | 0.3498 | 3.3727 | 2.2364 | 0.4833 |
| Planar reconstruction | 0.6383 | 0.2017 | 0.0917 | 1.0972 | 0.3225 | 0.1580 | 1.6317 | 0.3994 | 0.2348 | 2.2217 | 0.7261 | 0.3195 |
| Proposed method (K=2) | 0.0372 | 0.2048 | 0.0053 | 0.0751 | 0.3295 | 0.0109 | 0.1647 | 0.4021 | 0.0236 | 0.3394 | 0.6990 | 0.0488 |
| Proposed method (K=4) | 0.0312 | 0.1587 | 0.0045 | 0.0557 | 0.2549 | 0.0080 | 0.0683 | 0.2890 | 0.0098 | 0.1330 | 0.5153 | 0.0191 |
| | | | | | | With camera-motion noise | | | | | | |
| Naive triangulation | 3.0058 | 0.3214 | 0.4327 | 3.4568 | 0.5304 | 0.4989 | 4.5159 | 0.9182 | 0.6468 | 4.9208 | 1.7227 | 0.7040 |
| Planar reconstruction | 2.8668 | 0.2067 | 0.4128 | 2.9781 | 0.3346 | 0.4299 | 3.8155 | 0.4555 | 0.5470 | 4.0049 | 0.6995 | 0.5748 |
| Proposed method (K=2) | 0.0703 | 0.2152 | 0.0102 | 0.1290 | 0.3486 | 0.0183 | 0.2741 | 0.4797 | 0.0394 | 0.4505 | 0.7181 | 0.0652 |
| Proposed method (K=4) | 0.0587 | 0.1501 | 0.0092 | 0.1076 | 0.2538 | 0.0151 | 0.2200 | 0.3271 | 0.0317 | 0.3097 | 0.5023 | 0.0442 |

METHOD AND APPARATUS FOR 3D RECONSTRUCTION OF PLANES PERPENDICULAR TO GROUND

CROSS-REFERENCE TO RELATED APPLICATION

This application claims priority under 35 U.S.C. § 119 to Korean Patent Application No. 10-2020-0107405 filed on Aug. 25, 2020 in the Korean Intellectual Property Office, the subject matter of which is hereby incorporated by reference.

BACKGROUND

Embodiments of the inventive concept relate to methods and apparatuses for three-dimensional (3D) reconstruction. More particularly, embodiments of the inventive concept relate to methods and apparatuses for reconstructing planes perpendicular to the ground.

Image capture device(s) including image sensor(s) are commonly included in contemporary and emerging electronic devices, such as smart phones, PCs, surveillance cameras, and autonomous vehicles. Some image capture devices may be used as stand-alone devices.

Methods of estimating 3D coordinate information from two-dimensional (2D) correlation(s) of an image sequence have become an important aspect of various technologies in the field of computer vision. Triangulation is one method that may be used to estimates 3D coordinate information. However, when there is noise in 2D feature points the resulting (or estimated) 3D coordinate information may become inaccurate. Accordingly, several methods have been proposed to reduce the influence of (or correct) noise in relation to the estimation of 3D coordinate information from 2D feature points. One of the methods, among others, used to correct noise in relation to 2D feature points uses epipolar constraint conditions relying on epi-polar geometry. Indeed, there are existing studies that have greatly improved the accuracy of 3D coordinate information when 3D reconstruction is performed using homography for points on a plane.

SUMMARY

Embodiments of the inventive concept provide methods and apparatuses for 3D reconstruction that markedly reduce 3D reconstruction errors by simultaneously reconstructing planes perpendicular to the ground.

According to an aspect of the inventive concept, there is provided an apparatus for 3D reconstruction including; an event trigger module that determines whether to perform a 3D reconstruction, a motion estimation module than obtains motion information, and a reconstruction module that receives a first front image having a first view point and a second front image having a second view point, and obtains 3D coordinate values of a camera coordinate system based on the first front image and the second front image, wherein each of the first front image and the second front image includes planes, and each of the planes is perpendicular to the ground and includes feature points.

According to an aspect of the inventive concept, there is provided a method of three-dimension (3D) reconstruction including; determining whether to perform a 3D reconstruction, obtaining motion information upon determining to perform the 3D reconstruction, and obtaining 3D coordinate values of a camera coordinate system based on a first front image having a first view point and a second front image having a second view point, wherein each of the first front image and the second front image includes planes perpendicular to the ground and includes feature points.

According to an aspect of the inventive concept, there is provided an electronic device including; a camera that obtains a front image, and a three-dimension (3D) reconstruction apparatus including an event trigger module that determines whether to perform 3D reconstruction, a motion estimation that obtains motion information, and a reconstruction module that receives a first front image having a first view point and a second front image having a second view point and obtains 3D coordinate values of a camera coordinate system based on the first front image and the second front image, wherein each of the first front image and the second front image includes planes perpendicular to the ground and includes feature points.

BRIEF DESCRIPTION OF THE DRAWINGS

Embodiments of the inventive concept may be more clearly understood upon consideration of the following detailed description taken in conjunction with the accompanying drawings in which:

FIG. 7 is a table listing an example in which a 3D reconstruction error is reduced according to embodiments of the inventive concept;

FIG. 11 is a table listing an example in which an error of an external parameter is reduced according to embodiments of the inventive concept.

DETAILED DESCRIPTION

Throughout the written description and drawings, like reference numbers and labels are used to denote like or similar elements and/or features.

Figure (FIG.) 1 is a block diagram illustrating a 3D reconstruction apparatus according to embodiments of the inventive concept.

Figure 1:
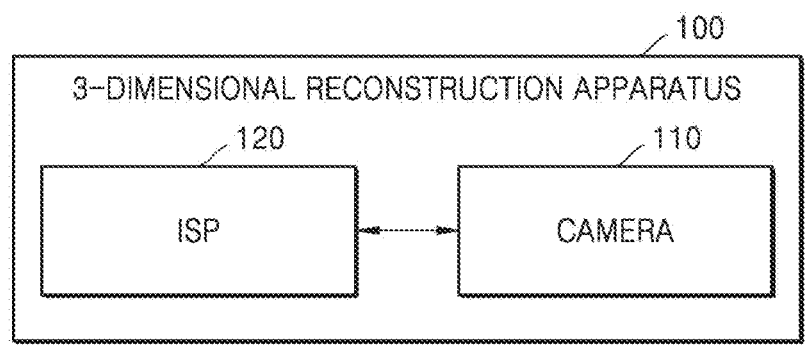
FIG. 1 is a block diagram illustrating a 3D reconstruction apparatus according to embodiments of the inventive concept.

Referring to FIG. 1, a 3D reconstruction apparatus 100 may include a camera 110 and an image signal processor (ISP) 120.

In some embodiments, the 3D reconstruction apparatus 100 may be embedded in an electronic device or may be implemented as an electronic device. The electronic device may be implemented as, for example, a personal computer (PC), an Internet of Things (IoT) device, or a portable electronic device. The portable electronic device may be a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc.

In some embodiments, the camera 110 (e.g., a pinhole camera) may be embedded in the 3D reconstruction apparatus 100 in order to recognize an external environment associated with the 3D reconstruction apparatus 100. In this regard, the camera 110 may generate an image by converting electromagnetic energy (e.g., visible light) from the external environment into a corresponding electrical signal(s) (e.g., an image signal) that may be transmits to and processed by the ISP 120.

In some embodiments, the camera 110 may have various internal parameters and/or external parameters. Internal parameters may be certain values associated with physical features of the camera 110, such as focal length, principal point, skew coefficient, etc. Exemplary internal parameters will be described hereafter in some additional detail.

In some embodiments, the camera 110 may be included in (or incorporated by) the 3D reconstruction apparatus 100, but embodiments of the inventive concept are not limited thereto. In some embodiments, the camera 110 may be implemented as a separate circuit from the 3D reconstruction apparatus 100. The camera 110 may be used to capture a front image (e.g., a front-facing image from the perspective a user) or some other image derived from the external environment and provide the captured image to the 3D reconstruction apparatus 100.

In some embodiments, the ISP 120 may perform 3D reconstruction of 2D coordinates based on the captured image.) Hereinafter, a front image will be assumed for descriptive purposes). In some embodiments, the ISP 120 may calculate a motion vector based on a sequence of feature points associated with a front image obtained by the camera 110. Thereafter, the ISP may reconstruct 3D coordinates of the feature points based on coplanarity and semidefinite problem (SDP) relaxation between the motion vector and a normal vector of planes perpendicular to the ground. In this context, the term "the ground" is used in its commonly understood vernacular, and generally denotes a visual aspect (or reference) associated with a captured image. Thus, the term "the ground" may literally denote the ground (or object (e.g., a floor or similar structure) upon the ground) upon which a user stands or sits.

Figure 2:
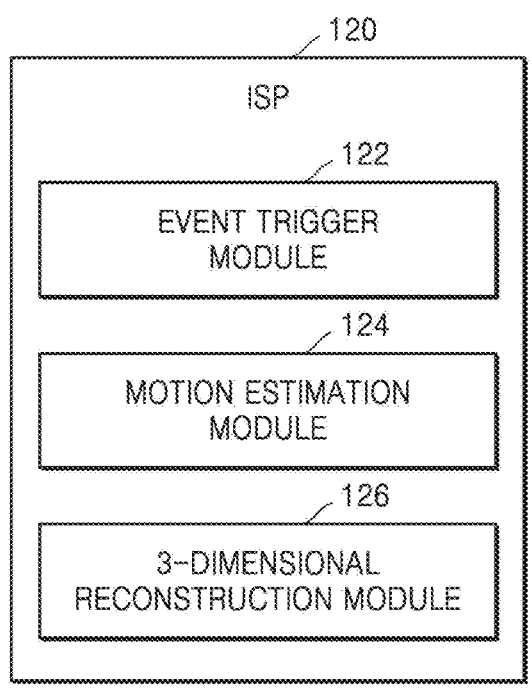
FIG. 2 is a block diagram further illustrating in one example the ISP 120 of FIG. 1.

FIG. 2 is a block diagram further illustrating in one example the ISP 120 of FIG. 1.

Referring to FIG. 2, the ISP 120 may include an event trigger module 122, a motion estimation module 124 and a 3D reconstruction module 126.

The event trigger module 122 may be used to detect a calibration event and trigger estimation of an external parameter.

In some embodiments, the ISP 120 may set an object having a grid pattern as an object of interest. When an object including a grid pattern is detected in the front image obtained by the camera 110, the ISP 120 may determine whether the object is a vertical plane including a grid pattern for calibration, and may trigger estimation of an external parameter according to a result of the determination.

In some embodiments, the 3D reconstruction apparatus 100 may be embedded in a host vehicle capable of autonomous driving. In such cases, the ISP 120 may trigger performing a 3D reconfiguration in response to reception of a control signal from a wireless communication circuit of the host vehicle. For example, an area in which the grid pattern for calibration is installed may be provided with an apparatus for transmitting a wireless signal for triggering a 3D reconstruction to any vehicle passing nearby.

Here, the wireless signal may be a Bluetooth-based beacon signal, for example. The host vehicle may receive a beacon signal through the wireless communication circuit and transmit the beacon signal to the ISP 120. When the ISP 120 receives the beacon signal, the ISP 120 may identify that there is a grid pattern for calibration around the host vehicle and trigger a measurement of an external parameter. That is, in response to the reception of the beacon signal, extraction of an area of interest including an object of a grid pattern may be performed.

In some embodiments, the event trigger module 122 may trigger performing a 3D reconstruction in response to detection of at least two objects of a grid pattern. When there are at least two planes perpendicular to the ground, the 3D reconstruction apparatus 100 may three-dimensionally reconstruct the at least two planes simultaneously, thereby reducing errors during the 3D reconstruction, as compared with cases in which the at least two planes are three-dimensionally reconstructed individually.

In some embodiments, the motion estimation module 124 may extract feature points and estimate motion parameters and a motion vector of a host vehicle based on changes in the feature points.

The motion parameter may include a rotation matrix that indicates how much (or to what degree) the host vehicle 200 is rotated during consecutive frames, and a translation vector that indicates how much (or to what extent) the host vehicle 200 has moved during the consecutive frames.

In some embodiment, the motion estimation module 124 may estimate motion parameters of the host vehicle 200 based on changes in feature points by using a constraint that the plane including the object of the grid pattern is perpendicular to the ground. The motion estimation module 124 may calculate an essential matrix based on a sequence of the feature points, and may calculate a rotation matrix and a translation vector through decomposition of the essential matrix. The motion estimation module 124 may obtain a motion vector based on the rotation matrix and the translation vector obtained through the deposition of the essential matrix.

In some embodiments, the 3D reconstruction module 126 may convert 2D coordinates of an image plane into 3D coordinates in relation to a camera coordinate system. The 3D reconstruction module may convert the 2D coordinates to the 3D coordinates using triangulation, for example. Here, triangulation may use relationship(s) between feature points when a same object is viewed from different viewpoints in relation to an epi-polar geometry. Thus, the reconstructed 3D coordinates may correspond to 3D coordinates on the camera coordinate system.

In some embodiments, the 3D reconstruction module 126 may be based on a quadratically constrained quadratic program (QCQP) formulation for simultaneous 3D reconstruction of at least two planes perpendicular to the ground. The QCQP formulation may correspond to non-deterministic hard problems. In this context, the term non-deterministic hard problems refer to problems that may be solved for accurate answers only by checking all numbers of cases. Non-deterministic hard problem(s) may be solved by obtaining an optimal value or an approximate value based on an SDP relaxation.

In some embodiments, the 3D reconstruction module 126 may obtain a homography for each of at least two planes based on the SDP relaxation. The 3D reconstruction module 126 may replace the QCQP formulation with an SDP to obtain an optimal value. The optimal value may include a normal vector for each of the at least two planes. Thereafter, the 3D reconstruction module 126 may calculate a homography using the normal vector obtained for each of the at least two planes.

Figure 3:
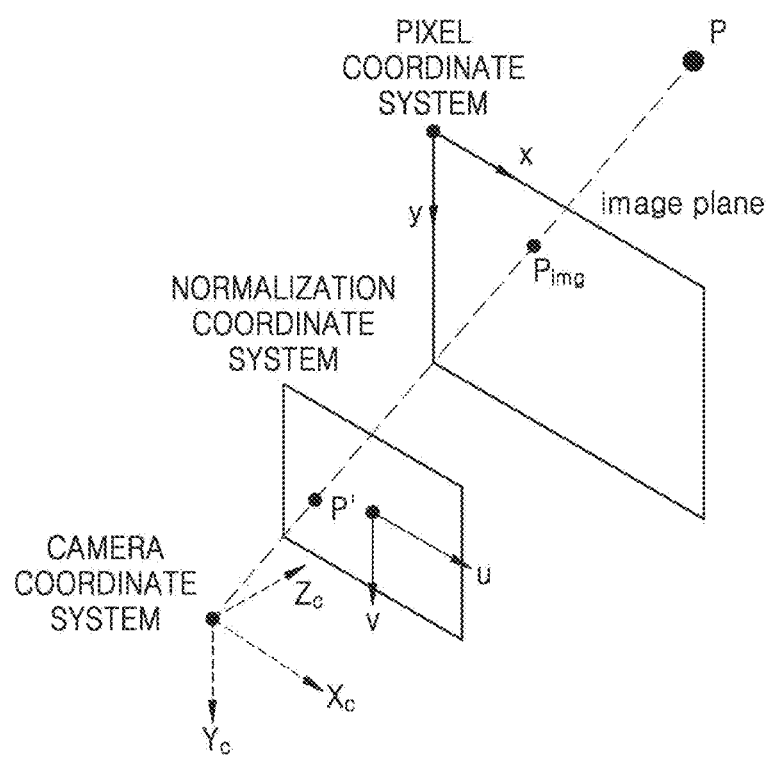
FIG. 3 is a conceptual diagram illustrating examples of a pixel coordinate system, a normalization coordinate system and a camera coordinate system.

FIG. 3 is a conceptual diagram illustrating examples of a pixel coordinate system, a normalization coordinate system and a camera coordinate system.

Referring to FIG. 3, a world coordinate system may refer to a coordinate system for representing the actual world corresponding to the external environment of the 3D reconstruction apparatus 100. In some embodiments, when the camera 110 of the 3D reconstruction apparatus 100 is set as an origin, the resulting world coordinate system may be understood (or referred to) as a camera coordinate system.

In some embodiments, a camera coordinate system (e.g., a vehicle coordinate system) may be characterized as having an $X_c$ axis, a $Y_c$ axis and a $Z_c$ axis. Here, as one example, the camera coordinate system assumes that the $Z_c$ axis corresponds to a front direction in which the camera responds, the $X_c$ axis corresponds to the right-angle direction based on the direction in which the camera 110 responds, and the $Y_c$ axis corresponds to a downward direction based on the direction in which the camera 110 responds.

A pixel coordinate may refer to a 2D area in which the real world is projected through the camera 110. Because the pixel coordinate system is a 2D area, the pixel coordinate system may have coordinates that are distinguished pixel-by-pixel. For example, when the upper left end of an image plane is set as an origin, the right direction may be expressed as an X-axis and the downward direction may be expressed as a Y-axis. Here, the 'x' and 'y' components of the pixel coordinate system may each be a pixel unit.

A normalization coordinate system may refer to a coordinate system originating from a point (i.e., a point of origin) at which a normalized image plane intersects with an optical axis ($Z_c$ axis) of the camera 110. In the normalization coordinate system, the right direction from the point of origin may be represented as a 'u' axis and the downward direction from the point of origin may be represented as a 'v' axis.

In some embodiments, conversion between the pixel coordinate system and the normalization coordinate system may be performed in accordance with Equation 1.

$$\begin{bmatrix} u \\ v \\ 1 \end{bmatrix} = \begin{bmatrix} f_x & skew\_cf_x & c_x \\ 0 & f_y & c_y \\ 0 & 0 & 1 \end{bmatrix} \begin{bmatrix} x \\ y \\ 1 \end{bmatrix}$$ [Equation 1]

In the foregoing, u and v denote coordinates on the normalization coordinate system, x and y denote coordinates on the pixel coordinate system, '$f_x$' and '$f_y$' denote focal lengths, 'cx' and 'cy' denote principal points, and ($skew\_cf_x$) denotes a skew coefficient.

The focal length refers to a distance between the center of a lens of the camera 110 and the image sensor, and may be a pixel unit. The principal point may refer to an image coordinate of a point at which the vertical line of the center point of the lens of the camera 110 intersects with the image sensor. The skew coefficient may be a value indicating how much the cell array of the image sensor is inclined toward the y-axis. The pixel coordinate system may be converted into a coordinate system that is not affected by internal parameters by being converted to a normalization coordinate system following a normalization.

Figure 4A:
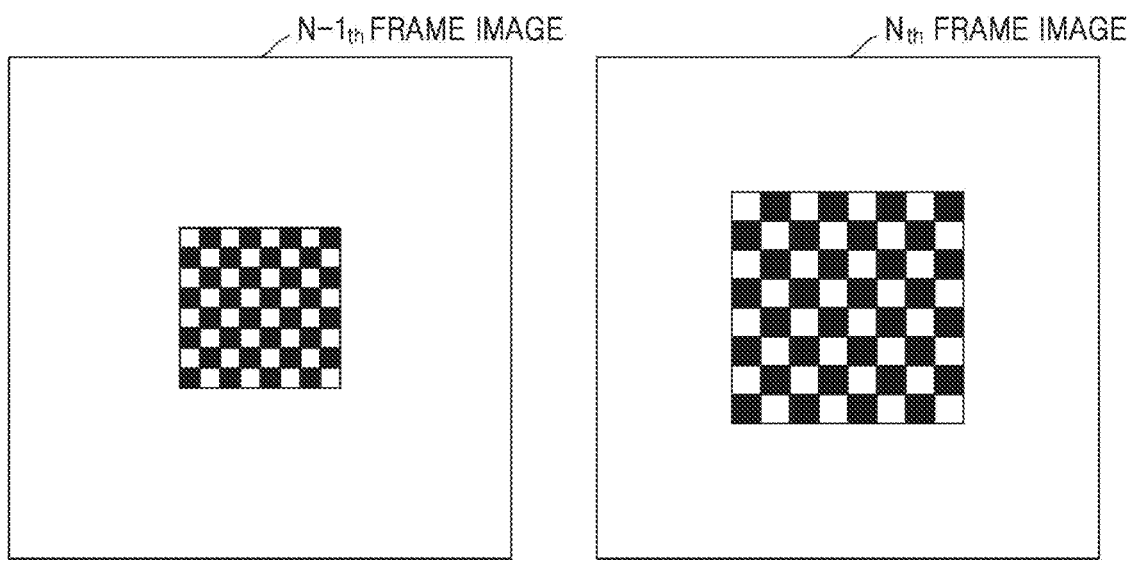
FIG. 4A is a diagram illustrating a frame change associated with motion of a 3D reconstruction apparatus according to embodiments of the inventive concept.
Figure 4B:
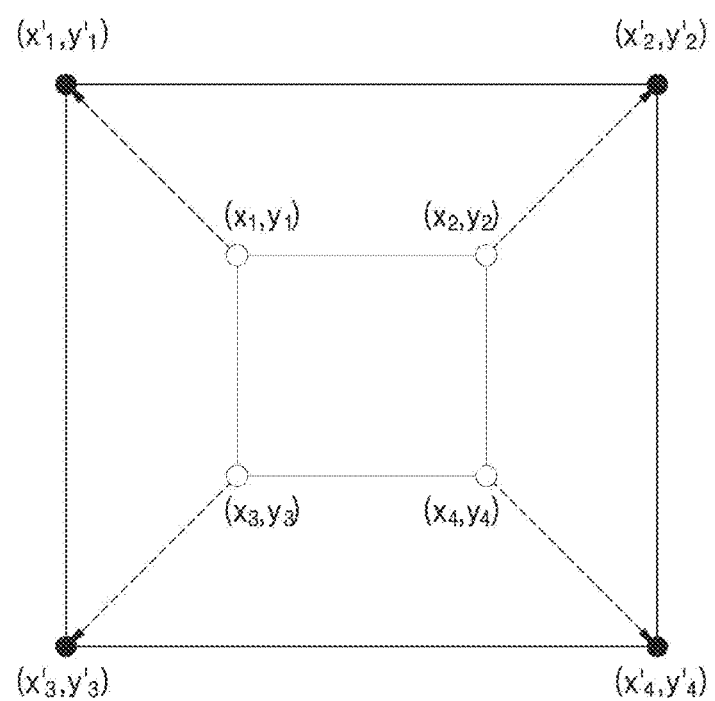
FIG. 4B is a diagram illustrating changes to feature points according to an example embodiment of the inventive concept.

FIG. 4A is a diagram illustrating a frame change in response to motion of a 3D reconstruction apparatus according to embodiments of the inventive concept, and FIG. 4B is a diagram illustrating changes in feature points according to embodiments of the inventive concept.

FIG. 4A describes a situation in which a plane including an object of a grid pattern is perpendicular to the ground and the 3D reconstruction apparatus 100 moves toward the plane. That is, the apparent size of the object of the grid pattern in an n-1th frame increases in an nth frame.

FIG. 4B describes changes in feature points constituting at least one rectangle of the grid pattern. For example, feature points constituting a rectangle in a first frame may include first to fourth points, coordinates of a first point may be ($x_1$, $y_1$), coordinates of a second point may be ($x_2$, $y_2$), coordinates of a third point may be ($x_3$, $y_3$), and coordinates of a fourth point may be ($x_4$, $y_4$). When the 3D reconstruction apparatus 100 moves forward in a second frame and the object of the grid pattern is placed on a plane perpendicular to the ground in front of the 3D reconstruction apparatus 100, first to fourth points may be moved in outward directions, respectively. Coordinates of a moved first point may be ($x'_1$, $y'_1$), coordinates of a moved second point may be ($x'_2$, $y'_2$), coordinates of a moved third point may be ($x'_3$, $y'_3$), and coordinates of a moved fourth point may be ($x'_4$, $y'_4$).

Figure 5:
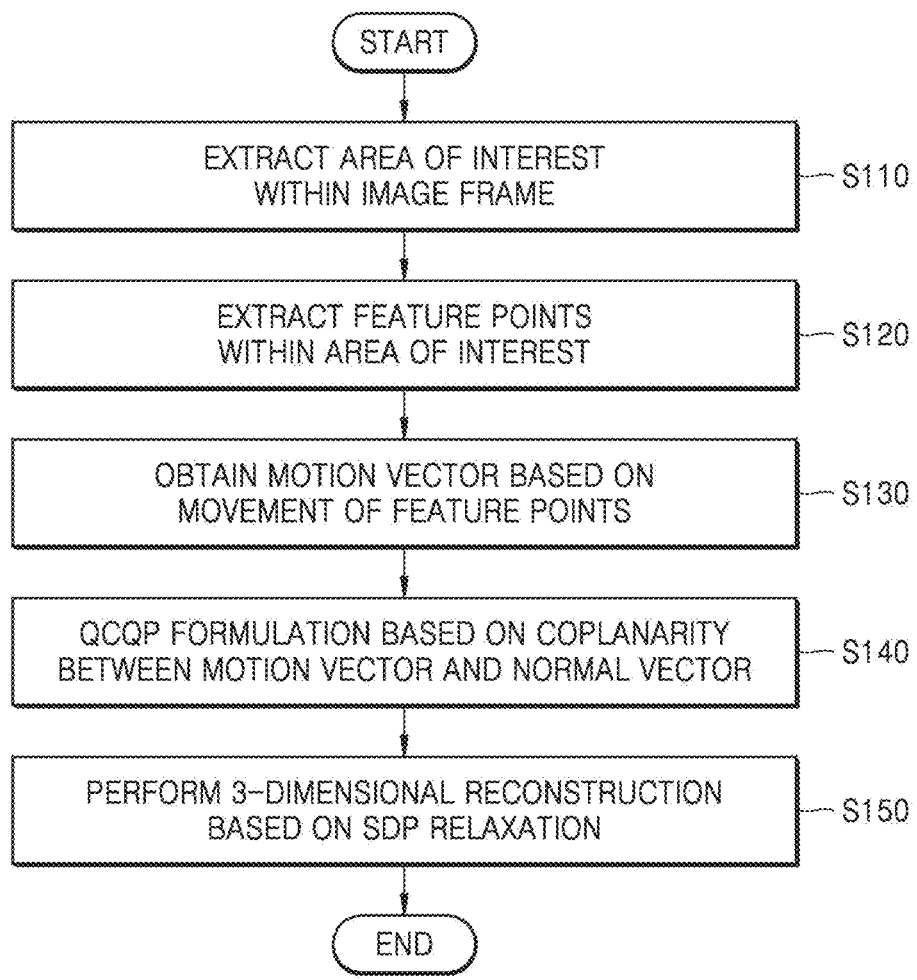
FIG. 5 is a flowchart summarizing in one example a method operating a 3D reconstruction apparatus according to embodiments of the inventive concept.

FIG. 5 is a flowchart summarizing in one example a method of operating a 3D reconstruction apparatus according to embodiments of the inventive concept.

Here, the 3D reconstruction apparatus 100 may extract an area of interest from within an image frame (S110). In this regard, the camera 110 may obtain an image for every frame and transmit the image to the ISP 120, and the ISP 120 may scan the image to determine whether the image includes a pre-defined area of interest. For example, the area of interest may include the object of the grid pattern shown in FIG. 4A, a rectangular window in a building's exterior wall, etc.

The 3D reconstruction apparatus 100 may then extract feature points from within the area of interest (S120). Here, for example, the feature points may include four (4) vertices defining a rectangle.

The 3D reconstruction apparatus 100 may then obtain a motion vector based on movement(s) of the feature points (S130). For example, referring to FIG. 5B, the coordinates of the first point may be changed from ($x_1$, $y_1$) to ($x'_1$, $y'_1$) as the host vehicle travels.

In some embodiments, assuming that internal parameters of the camera 110 including a focal length, a principal point, and a skew coefficient are known values, the 3D reconstruction apparatus 100 may normalize the feature points in the first frame and the second frame, respectively. Then, the 3D reconstruction apparatus 100 may calculate an essential matrix 'E' using Equation 2.

$$[u'\ v'\ 1]E\begin{bmatrix}u\\v\\1\end{bmatrix}=0 \qquad \text{[Equation 2]}$$

Here, u and v denote coordinates of a normalized pixel of the first frame, and u' and v' denote coordinates of the normalized pixel of the second frame. The essential matrix E satisfying Equation 2 may be expressed by Equation 3.

$$E=[t]\times R \qquad \text{[Equation 3]}$$

Here, 't' denotes a translation vector, 'R' denotes a rotation matrix, and the indicated x-operator denote a cross product. In other words, the 3D reconstruction apparatus 100 may obtain motion parameters through decomposition of an obtained essential matrix E into a rotation matrix and a translation vector. The 3D reconstruction apparatus 100 may calculate the motion vector of the 3D reconstruction apparatus 100 according to Equation 4 using the rotation matrix and the translation vector.

$$m=-R^T t \qquad \text{[Equation 4]}$$

Thus, the 3D reconstruction apparatus 100 may obtain 3D coordinates of the camera coordinate system corresponding to the feature points based on the motion parameters and a triangulation (S130). Then, the 3D reconstruction apparatus 100 may perform a QCQP formulation based on the coplanarity between the motion vector and a normal vector (S140).

That is, when homography is established between the first frame and the second frame, a relationship between feature points may be expressed according to Equation 5.

$$x_{i,k}' \simeq H_k x_{i,k} \qquad \text{[Equation 5]}$$

Here, $x_{i,k}$ denotes an i-th feature point on a k-th plane of a plurality of planes in the first frame, and $x'_{i,k}$ denotes an i-th feature point on a k-th plane in the second frame. Additionally, using the constraint of being a plane perpendicular to the ground, a homography $H_k$ applied to a k-th plane may be expressed by Equation 6.

$$H_k = R - t n_k \qquad \text{[Equation 6]}$$

Expressing Equation 5 in terms of Equation 6 yields Equation 7

$$X_{i,k}' \simeq H_k x_{i,k} = (R - t n_k^T) x_{i,k} \qquad \text{[Equation 7]}$$

which may be further expressed by Equation 8.

$$x_{i,k}^T = \frac{(x'_{i,k} \times R x_{i,k})^T (x'_{i,k} \times t)}{(x'_{i,k} \times t)^T (x'_{i,k} \times t)} = b_{i,k} \qquad \text{[Equation 8]}$$

Here, the x-operator again denotes a cross product between vectors, and an optimization problem for a normal vector of a k-th plane may be expressed by Equation 9.

$$\min_{n_k} \|A_k n_k - b_k\|^2 \qquad \text{[Equation 9]}$$

Here, $A_k$, $B_k$ may be $A_k[x_{1,k}, x_{2,k}, \ldots, x_{N_k,k}]^T \varepsilon R^{N_k \times 3}$ $b_k = [b_{1,k}, b_{2,k}, \ldots, b_{N_k,k}]^T \varepsilon R^{N_k}$, respectively.

In some embodiments, because a plurality of planes are perpendicular to the ground, a normal vector for each of the planes may be parallel to the ground. Also, when a cross product is performed between the normal vectors of the planes, a normal vector for the ground may be obtained. When a dot product is performed with respect to the normal vector for the ground with a motion vector, a dot product between the motion vector and the normal vector may become zero (0). Coplanarity, which is a constraint associated with the planes, may be expressed by Equation 10.

$$(n_1 \times n_k) \cdot m = 0, k=2, \ldots, K \qquad \text{[Equation 10]}$$

To replace an optimization problem with a QCQP problem, the constraint may be restated. Here, a concatenated normal vector w may be defined by Equation 11.

$$w = [n_1^T, \ldots, n_K^T]^T. \qquad \text{[Equation 11]}$$

When the coplanarity of Equation 10 is substituted using Equation 11, Equation 12 results.

$$w^T C_k w = 0, k=2, \ldots, K \qquad \text{[Equation 12]}$$

Here, '$C_K$' denotes to a symmetric block matrix having 3K columns and 3K rows, partially including a zero matrix of 3×3. That is, $C_k$ is a set of 3×3 matrices of $C_{ij}$, and partial matrices for $C_{1k}$ and $C_{k1}$ in $C_k$ may not be zero. $C_{ij}$ may denote a partial matrix of an i-th row and a j-th column. $C_{1k}$ and $C_{k1}$ may be expressed as shown in $C_{1k}=[m]_x$ and $C_{k1}=[m]_x^T$, respectively.

In some embodiments, when a dimension of 'W' is increased by 1 to replace an optimization problem that minimizes an objective function of Equation 10, the result may be expressed by Equation 13.

$$\tilde{w} = [w^T, 1]^T \qquad \text{[Equation 13]}$$

In some embodiments, Equation 9 for the objective function and Equation 10 for coplanarity which is a constraint, may be expressed in terms of Equation 13 to yield Equation 14.

$$\min_{\tilde{w}} \tilde{w}^T Q \tilde{w}$$

subject to $\tilde{w}^T \tilde{C}_k \tilde{w} = 0$, for $k=2, \ldots, K$, $$\tilde{w}^T C_0 \tilde{w} = 1, \qquad \text{[Equation 14]}$$

Here, $$Q = \begin{bmatrix} \tilde{A}^T \tilde{A} & -\tilde{A}^T b \\ -b^T \tilde{A} & 0 \end{bmatrix}$$

and $$\tilde{C}_k = \begin{bmatrix} C_k & 0 \\ 0^T & 0 \end{bmatrix}.$$

Also, $$C_0 = \begin{bmatrix} 0_{3K} & O \\ 0^T & 1 \end{bmatrix}.$$

$0_{3k}$ may denote a zero matrix of 3K×3K.

Because the objective function for finding the minimum value is replaced by the quadratic function of a positive semidefinite matrix, and the coplanarity, which is the constraint, is replaced by the quadratic equation of symmetric matrices, it indicates that Equation 14 is formulated as a QCQP.

The 3D reconstruction apparatus 100 may then perform a 3D reconstruction based on SDP relaxation (S150).

To change a QCQP to an SDP and to relax rank constraints, Equation 15 may be used.

$$X = \tilde{w} \tilde{w}^T \qquad \text{[Equation 15]}$$

Here, when 'X' is replaced by the dot product of a concatenation normal vector with an increased dimension and a transpose of the concatenated normal vector, the QCQP of Equation 14 may be expressed by Equation 16.

$$\underset{x \in S_+}{\text{minimize}} \langle Q, X \rangle$$

$$\text{subject to } \langle \tilde{C}_k, X \rangle = 0, k = 2, \ldots, K$$

$$\langle C_0, X \rangle = 1$$

$$\text{rank}\langle X \rangle > 1 \quad \text{[Equation 16]}$$

By eliminating the rank constraint of Equation 16, SDP relaxation of the QCQP may be obtained, and the SDP relaxation may be expressed by Equation 17.

$$\underset{x \in S_+}{\text{minimize}} \langle Q, X \rangle$$

$$\text{subject to } \langle \tilde{C}_k, X \rangle = 0, k = 2, \ldots, K$$

$$\langle C_0, X \rangle = 1 \quad \text{[Equation 17]}$$

In some embodiments, because the SDP is included in a convex optimization problem, it may be ensured that, even when a local optimum value is obtained, the local optimum value is equal to a global optimum value.

When an optimal X of the SDP is calculated, a concatenated normal vector w̃ with an increased dimension may be obtained. Because w̃ is a vector formed by connecting respective normal vectors of a plurality of planes, the respective normal vectors of the planes may be obtained by obtaining w̃.

In some embodiments, the 3D reconstruction apparatus 100 may apply the normal vectors of the planes to the following equation to obtain homography of the planes, respectively. That is, $x_{i,k}^I$ may be obtained using Equations 5 and 6 above.

Figure 6:
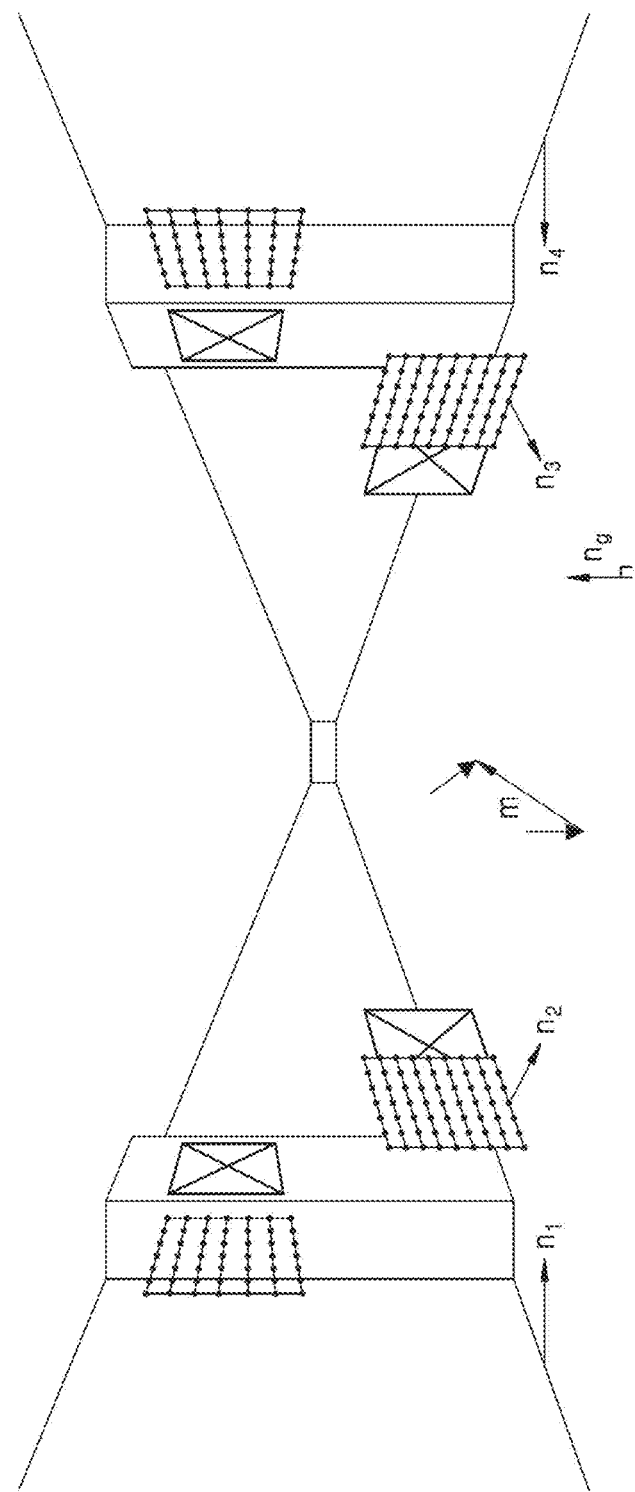
FIG. 6 is a conceptual diagram illustrating an exemplary front image consistent with embodiments of the inventive concept.

FIG. 6 is a conceptual diagram illustrating in one example a front image consistent with example embodiments of the inventive concept.

Referring to FIG. 6, the camera 110 is assumed to identify four (4) planes. Each of the four planes may correspond to a plane that is perpendicular to the ground and includes objects of a grid pattern.

Accordingly, the 3D reconstruction apparatus 100 may extract feature points from the four planes, and calculate a motion vector based on feature points moving according to an image sequence. That is, the 3D reconstruction apparatus 100 may convert coordinates of feature points of each of the first frame and the second frame into normalization coordinates using Equation 1, calculate an essential matrix satisfying Equation 2 between the coordinates of the feature point of the first frame and the second frame, and obtain a motion vector according to Equation 4 through decomposition of the essential matrix. The motion vector is for indicating the motion of the 3D reconstruction apparatus 100 or the camera 110 and may correspond to a vector M of FIG. 6.

The 3D reconstruction apparatus 100 may replace an optimization problem for a normal vector with a QCQP and may simultaneously calculate normal vectors for a plurality of planes through SDP relaxation for the QCQP. Referring to FIG. 6, normal vectors for four planes may correspond to vectors n1 to n4. Thereafter, the 3D reconstruction apparatus 100 may calculate homography using normal vectors for the respective four planes and convert the calculated homography to corresponding coordinates on a 3D camera coordinate system.

FIG. 7 is a table listing an example in which a 3D reconstruction error is reduced according to embodiments of the inventive concept.

Referring to FIG. 7, the term "Naïve Triangulation" refers to a conventional 3D reconstruction method, which is a method of individually performing 3D reconstruction for each feature point (hereinafter, a "first method"), wherein "Planar Reconstruction" refers to a method for simultaneous 3D reconstruction of feature points arranged on one plane (hereinafter, a "second method").

Referring to FIG. 7, Gaussian pixel noise is applied to a 2D pixel coordinate system, and the standard deviation is varied from 0.1 to 3.

When the standard deviation of the Gaussian pixel noise is 0.1 and feature points 8 meters ahead are three-dimensionally reconstructed, the size of a reconstruction error is "0.0157 [m]" when the feature points are three-dimensionally reconstructed according to the first method and the size of the reconstruction error is "0.0037 [m]" when the feature points are three-dimensionally reconstructed according to the second method. That is, when feature points including Gaussian pixel noise are three-dimensionally reconstructed individually, the size of the reconstruction error is relatively large. However, when a plurality of feature points arranged on the same plane are reconstructed simultaneously, the reconstruction error is greatly reduced.

However, in the case of three-dimensionally reconstructing a plurality of planes simultaneously according to FIGS. 5 to 6, it may be seen that the size of the reconstruction error is further reduced than when the plurality of planes are individually reconstructed. For example, when two planes are three-dimensionally reconstructed simultaneously, the size of the reconstruction error is "0.0032 [m]". However, when four planes are three-dimensionally reconstructed simultaneously, the size of the reconstruction error is "0.0030 [m]". In other words, the 3D reconstruction apparatus 100 may reduce the size of the reconstruction error as the number of planes that are reconstructed simultaneously increases. In the case of reconstructing feature points 10 meters ahead or Gaussian pixel noise having a small standard deviation, it is obvious that the size of the reconstruction error increases. However, it may be seen that the size of the reconstruction error is smaller than those in the case of 3D reconstructions according to the first method and the second method, and the size of the reconstruction error may still be reduced as more planes are three-dimensionally reconstructed simultaneously.

Figure 8:
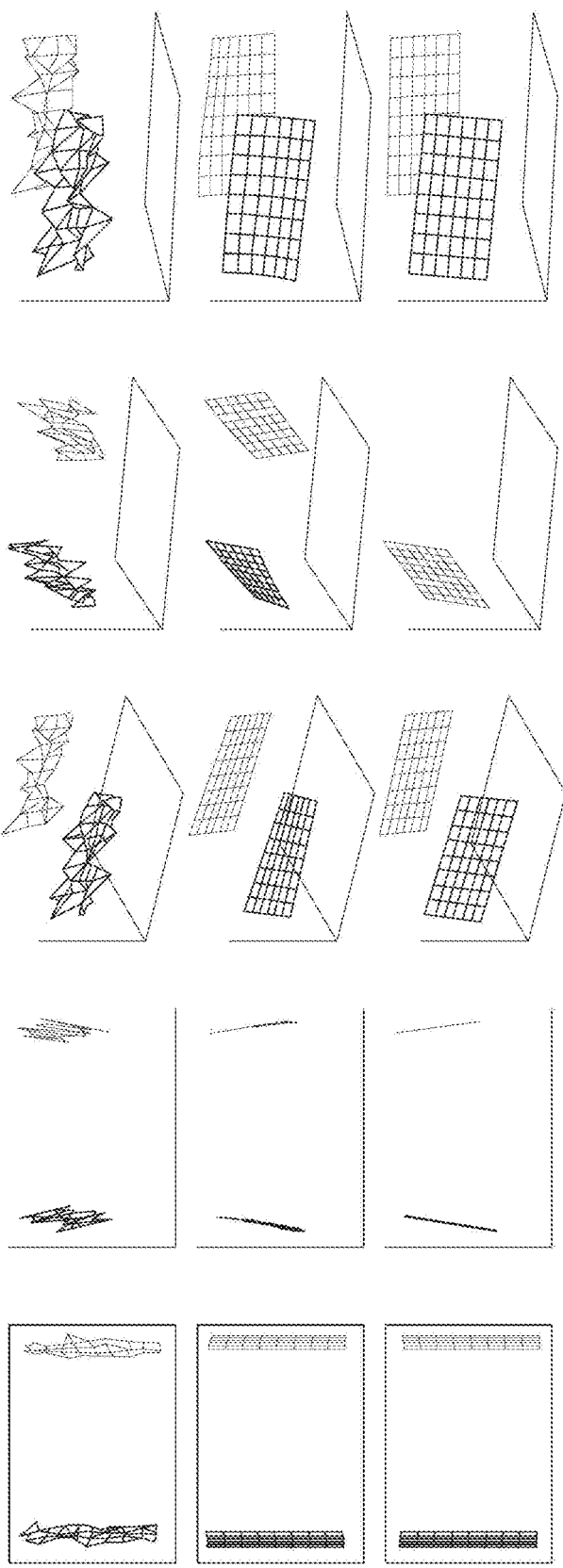
FIG. 8 is a graph illustrating results of performing 3D reconstructions according to an embodiments of the inventive concept.

FIG. 8 is a conceptual graph illustrating exemplary results of performing 3D reconstructions according to embodiments of the inventive concept.

Referring to FIG. 8, a first row represents 3D coordinates recovered according to the first method of individually reconstructing feature points, a second row represents 3D coordinates recovered according to the second method of simultaneously reconstructing a plurality of feature points included in one plane, and a third row represents 3D coordinates recovered according to a method of simultaneously reconstructing a plurality of planes.

Referring to the first row, it may be seen that three-dimensionally reconstructed coordinates are unable to form coplanarity. In other words, when the feature points are individually reconstructed according to the first method, the sizes of noise in the feature points are different from one another. Therefore, the size of the reconstruction error is large, and the feature points may not be arranged on the same plane.

Referring to the second row, it may be seen that three-dimensionally reconstructed coordinates form coplanarity, but the feature points are reconstructed in the form of a curved plane. In other words, when feature points existing on one plane are reconstructed simultaneously according to the second method, the feature points may be reconstructed to be arranged on the same plane, but the plane may be a plane including a reconstruction error of a predetermined size. Unlike the first row and the second row, it may be seen that, in the third row, the three-dimensionally reconstructed coordinates are arranged on one flat plane.

Figure 9A:
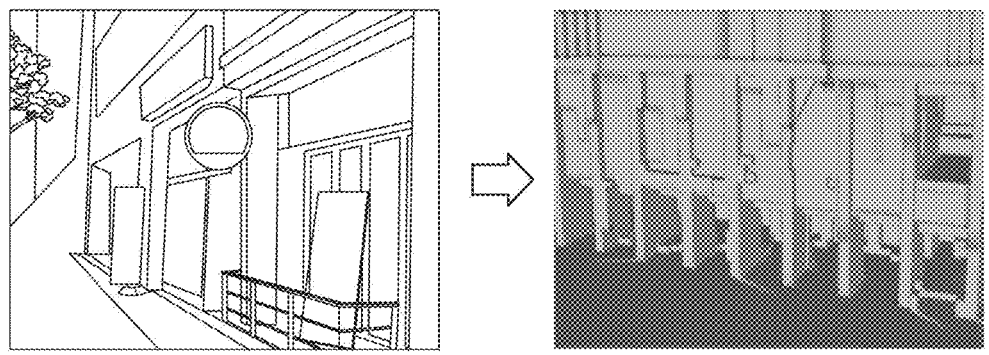
FIGS. 9A and 9B are respective diagrams illustrating examples of reconstructing planes perpendicular to the ground according to embodiments of the inventive concept.
Figure 9B:
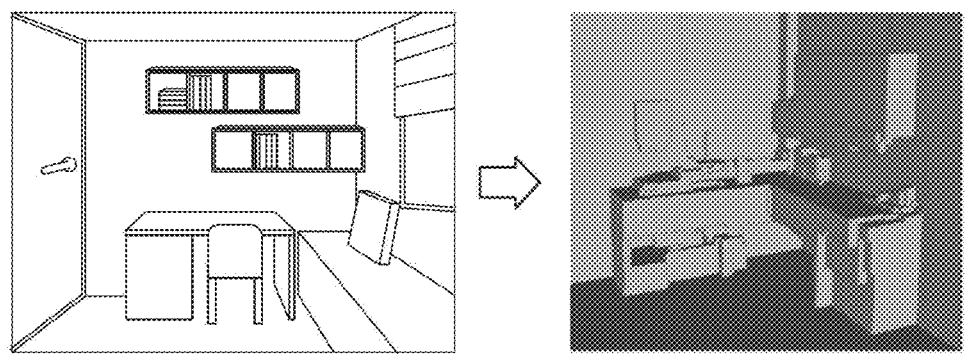

FIGS. 9A and 9B are respective, conceptual diagrams illustrating examples of reconstructing planes perpendicular to the ground according to embodiments of the inventive concept.

In some embodiments, the 3D reconstruction apparatus 100 may further include additional modules for image processing. For example, the 3D reconstruction apparatus 100 may further include a segmentation module for dividing (or partitioning) each surface in an input image or a front image and a classifier for determining whether a plane is perpendicular to the ground.

Referring to FIG. 9A, the 3D reconstruction apparatus 100 may receive an image of the exterior of a building. A structure like a building may include a combination of planes that are perpendicular to the ground. For example, the 3D reconstruction apparatus 100 may set the shape of a window existing in the outer wall of a building to an object of interest and extract feature points constituting the object of interest. The 3D reconstruction apparatus 100 may identify planes perpendicular to the ground based on the feature points and the segmentation module and the classifier, and may significantly reduce the size of a 3D reconstruction error by three-dimensionally reconstructing the identified planes simultaneously. Therefore, the accuracy of a three-dimensionally reconstructed perspective view may also be improved.

Referring to FIG. 9B, the 3D reconstruction apparatus 100 may receive an image of the interior of a building. The internal structure of a building may include a combination of planes perpendicular to the ground. For example, the 3D reconstruction apparatus 100 may set an object of interest (e.g., a shelf, a wall, a refrigerator, etc.) that is likely to include planes perpendicular to the ground and extract feature points constituting the object of interest. The 3D reconstruction apparatus 100 may identify planes perpendicular to the ground based on the feature points and the segmentation module and the classifier, and may reduce the size of a 3D reconstruction error by three-dimensionally reconstructing the identified planes simultaneously.

Figure 10:
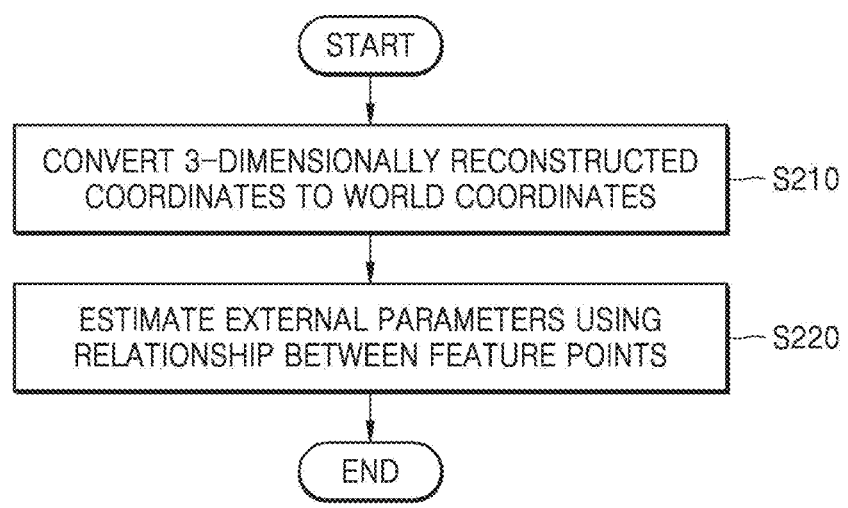
FIG. 10 is a flowchart summarizing a method of estimating external parameters according to embodiments of the inventive concept.

FIG. 10 is a flowchart summarizing a method of estimating external parameters according to embodiments of the inventive concept.

Referring to FIG. 10, the 3D reconstruction apparatus 100 may convert three-dimensionally reconstructed coordinates into world coordinates (S210). The world coordinates may have a point of origin at which a straight line perpendicular to the ground from the camera 110 crosses the ground.

In some embodiments, the world coordinate system may be assumed to have an $X_w$ axis, a $Y_w$ axis and a $Z_w$ axis. Here, the $X_w$ axis of the world coordinate system may correspond to a direction in which the 3D reconstruction apparatus 100 travels, the $Z_w$ axis may correspond to a direction perpendicular to the ground, and the $Y_w$ axis may correspond to a left-angle direction from the direction in which the 3D reconstruction apparatus 100 travels.

With this assumption of nomenclature, Equation 18 may be used to express certain relationships.

$$X_C = R(\theta,\phi;\psi)X_w + t(\theta,\phi,h;\psi) \quad \text{[Equation 18]}$$

This equation assumes that feature points are arranged on a plane perpendicular to the ground, and thus homography is established. Thus, $R(\theta, \phi; \psi)$ may represent the rotation matrix of a homography, $t(\theta, \phi; \psi)$ may represent the translation vector of the homography, $X_w$ may represent a vehicle coordinate system, and $X_c$ may represent a camera coordinate system. Here, $\theta$ represents a pitch angle, $\emptyset$ represents a roll angle, $\varphi$ represents a yaw angle, and h represents a variable of a camera height. The roll angle, the yaw angle, the pitch angle, and the camera height relate to a geometric position of the camera 110 and may be referred to as external parameters. The world coordinate system, the camera coordinate system, and the rotational transformation may be expressed by Equations 19, 20 and 21.

$$X_C = [X_C, Y_C, Z_C]^T \quad \text{[Equation 19]}$$

$$X_W = [X_W, Y_W, Z_W]^T \quad \text{[Equation 20]}$$

$$R(\theta, \phi; \psi) = \begin{bmatrix} c_\theta s_\psi c_\phi + s_\theta s_\phi & -c_\psi c_\phi & -s_\theta s_\psi c_\phi + c_\theta s_\phi \\ c_\theta s_\psi s_\phi - s_\theta c_\phi & -c_\psi s_\phi & -s_\theta s_\psi s_\phi - c_\theta c_\phi \\ c_\theta c_\psi & s_\psi & -s_\theta c_\psi \end{bmatrix} \quad \text{[Equation 21]}$$

Here, the rotation matrix is simplified as $\sin \theta = s_\theta$ and $\cos \theta = c_\theta$. Equations 22 assumes that the origin (0,0,0) of the camera coordinate system corresponds to a vertical point (0, 0, h) in the world coordinate system associated with the camera height.

$$0 = R(\theta,\phi;\psi) \cdot [0,0,h]^T + t(\theta,\phi,h;\psi) \quad \text{[Equation 22]}$$

Based on Equation 22, a translation vector may be expressed by Equation 23, where '$r_3$' refers to a third column of a rotation matrix.

$$t(\theta,\phi,h;\psi) = -r_3 h \quad \text{[Equation 23]}$$

Returning to the method of FIG. 10, the 3D reconstruction apparatus 100 may now estimate external parameters using a relationship between feature points (S220). As described above, the feature points are arranged on a plane perpendicular to the ground surface, and the height (vertical length) of a rectangle formed by the feature points is pre-defined. Also, it may be seen that feature points located on the normal perpendicular to the ground have a different $Z_w$ and the same $X_w$ and $Y_w$.

Such a constraint relationship between the feature points may be expressed by Equations 24, 25 and 26.

$$X_C^i - X_C^j = -(s_\theta s_\psi c_\phi - c_\theta s_\phi)(Z_w^i - Z_w^j) \quad \text{[Equation 24]}$$

$$Y_C^i - Y_C^j = -(s_\theta s_\psi c_\phi - c_\theta s_\phi)(Z_w^i - Z_w^j) \quad \text{[Equation 25]}$$

$$Z_C^i - Z_C^j = -s_\theta c_\psi (Z_w^i - Z_w^j) \quad \text{[Equation 26]}$$

In the foregoing, Equation 24 re-states the characteristic that a difference between the x component of an i-th coordinate of the world coordinate system and the x component of a z-th coordinate of the world coordinate system is zero (0), and Equation 25 re-states the characteristic that a difference between the y component of the i-th coordinate of the world coordinate system and the y component of the z-th coordinate of the world coordinate system is zero (0). $Z_w^i - Z_w^j$ of Equation 26 represents the vertical length as described above and may be a pre-defined value.

Using Equations 24, 25 and 26, the pitch angle (θ) and the roll angle (Ø) may be expressed by Equations 27 and 28.

$$s_\theta = \frac{Z_C^i - Z_C^j}{c_\psi(Z_W^i - Z_W^j)} \quad \text{[Equation 27]}$$

$$s_\phi = \frac{c_\theta(X_C^i - X_C^j) - s_\theta s_\psi(Y_C^i - Y_C^j)}{(s_\theta^2 s_\psi^2 + c_\theta^2)(Z_W^i - Z_W^j)} \quad \text{[Equation 28]}$$

Assuming that an extended focus is calculated and the yaw angle (p) is obtained, the rotation matrix may be determined by Equations 27 and 28. Further, the camera height may be estimated using the characteristics of the homography as expressed by Equation 29.

$$[r_1, r_2, -r_3][X_w, Y_w, h]^T = X_c - r_3 Z_w \quad \text{[Equation 29]}$$

In some embodiments, the 3D reconstruction apparatus 100 may estimate external parameters in relation to changes in the feature points on a pixel coordinate system, estimation of motion parameters based on the changes, and conversion of the feature points on the pixel coordinate system into 3D coordinates on a camera coordinate system, and/or a conversion relationship between the camera coordinate system and a vehicle coordinate system and a constraint of feature points of the vehicle coordinate system, without obtaining 3D coordinates on a world coordinate system. Also, in the process of converting to the 3D coordinates on the camera coordinate system, by simultaneously reconstructing a plurality of planes perpendicular to the ground, the size of a 3D reconstruction error may be reduced, and 3D coordinates of the camera coordinate system with improved accuracy may be obtained.

FIG. 11 is a table listing an example in which an error of an external parameter is reduced according to embodiments of the inventive concept.

Referring to FIG. 11, Gaussian pixel noise is applied to a 2D pixel coordinate system, and the standard deviation is varied from 0.1 to 3.

When the standard deviation of the Gaussian pixel noise is 0.1, feature points 8 meters ahead are three-dimensionally reconstructed according to the first method, and external parameters are measured based on the same, it may be seen that the size of an external parameter error is a pitch angle of "0.9829 [degree]", a roll angle of "0.2858 [degree]", and a camera height of "01413 [m]".

When feature points are three-dimensionally reconstructed according to the second method, the size of errors of the reconstructed feature points is reduced as described above. In other words, when external parameters are estimated using feature points with a reduced reconstruction error, the error of the external parameters may be further reduced. Referring to FIG. 11, it may be seen that the size of the external parameter error based on feature points reconstructed according to the second method is a pitch angle of "0.6383 [degree]", a roll angle of "0.2017 [degree]", and a camera height of "0.0917 [m]". In other words, it may be seen that, when a plurality of feature points arranged on the same plane are simultaneously reconstructed, a reconstruction error is reduced, and an error of estimation of external parameters based on the feature points with the reduced error is also reduced.

Also, in the case of three-dimensionally reconstructing a plurality of planes simultaneously according to FIGS. 5 to 6, it may be seen that the size of the reconstruction error is further reduced as compared to the case of the second method in which the plurality of planes are individually reconstructed. For example, when four planes are three-dimensionally reconstructed simultaneously and external parameters are estimated, it may be seen that the size of an external parameter error is a pitch angle of "0.0312 [degree]", a roll angle of "0.1587 [degree]", and a camera height of "0.0045 [m]". In other words, the 3D reconstruction apparatus 100 may reduce the size of the reconstruction error as the number of planes that are reconstructed simultaneously increases.

While the inventive concept has been particularly shown and described with reference to embodiments thereof, it will be understood that various changes in form and details may be made therein without departing from the spirit and scope of the following claims.

What is claimed is:

1. An apparatus for three-dimension (3D) reconstruction, the apparatus comprising a computing device comprising at least one processor, the computing device configured to:
   receive a first front image having a first view point and a second front image having a second view point,
   identify at least one plane perpendicular to the ground in each of the first front image and the second front image,
   identify feature points in the at least one plane in each of the first front image and the second front image,
   determine at least one homography for the at least one plane by applying a constraint of coplanarity between (i) normal vectors of the at least one plane and (ii) a motion vector associated with movement of the feature points between the first front image and the second front image, and
   obtain 3D coordinate values of a camera coordinate system using the at least one homography.

2. The apparatus of claim 1, wherein the computing device is configured to trigger 3D reconstruction in response to identifying a grid pattern in each of the at least one plane.

3. The apparatus of claim 1, wherein the computing device is configured to determine the at least one homography using a quadratically constrained quadratic program (QCQP) formulation.

4. The apparatus of claim 3, wherein the computing device is configured to apply a semidefinite program (SDP) relaxation to the QCQP formulation.

5. The apparatus of claim 4, wherein the at least one plane comprises multiple planes, and wherein the computing device is configured to simultaneously obtain the normal vectors of the multiple planes based on a solution of the SDP relaxation.

6. The apparatus of claim 1, wherein the computing device is configured to:
   extract a first feature point group from the first front image,
   extract a second feature point group from the second front image,
   calculate an essential matrix based on changes in the first feature point group and changes in the second feature point group,
   obtain a rotation matrix and a translation vector based on the essential matrix, and
   obtain the motion vector based on the rotation matrix and the translation vector.

7. A method of three-dimension (3D) reconstruction, the method comprising:
   obtaining a first front image having a first view point and a second front image having a second view point;

identifying at least one plane perpendicular to the ground in each of the first front image and the second front image;

identifying feature points in the at least one plane in each of the first front image and the second front image;

determining at least one homography for the at least one plane by applying a constraint of coplanarity between (i) normal vectors of the at least one plane and (ii) a motion vector associated with movement of the feature points between the first front image and the second front image; and obtaining 3D coordinate values of a camera coordinate system using the at least one homography.

8. The method of claim 7, comprising:

identifying a grid pattern in each of the at least one plane; and obtaining the motion vector in response to the identifying of the grid pattern in each of the at least one plane.

9. The method of claim 7, comprising determining the at least one homography using a quadratically constrained quadratic program (QCQP) formulation.

10. The method of claim 9, comprising applying a semidefinite program (SDP) relaxation to the QCQP formulation.

11. The method of claim 10, wherein the at least one plane comprises multiple planes, and wherein the method comprises:

simultaneously obtaining the normal vectors of the multiple planes based on a solution of the SDP relaxation.

12. The method of claim 7, comprising extracting a first feature point group from the first front image;

extracting a second feature point group from the second front image;

calculating an essential matrix based on changes in the first feature point group and changes in the second feature point group;

obtaining a rotation matrix and a translation vector based on the essential matrix; and calculating the motion vector based on the rotation matrix and the translation vector.

13. An electronic device comprising:

a camera configured to obtain a first front image having a first view point and a second front image having a second view point; and a three-dimension (3D) reconstruction apparatus comprising a computing device configured to receive the first front image and the second front image, identify at least one plane perpendicular to the ground in each of the first front image and the second front image, identify feature points in the at least one plane in each of the first front image and the second front image, determine at least one homography for the at least one plane by applying a constraint of coplanarity between (i) normal vectors of the at least one plane and (ii) a motion vector associated with movement of the feature points between the first front image and the second front image, and obtain 3D coordinate values of a camera coordinate system using the at least one homography.

14. The electronic device of claim 13, wherein the computing device is configured to trigger 3D reconstruction in response to identifying a grid pattern in each of the at least one plane.

15. The electronic device of claim 13, wherein the computing device is configured to determine the at least one homography using a quadratically constrained quadratic program (QCQP) formulation.

16. The electronic device of claim 15, wherein the computing device is configured to apply a semidefinite program (SDP) relaxation to the QCQP formulation.

17. The electronic device of claim 16, wherein the at least one plane comprises multiple planes, and wherein the computing device is configured to simultaneously obtain the normal vectors of the multiple planes based on a solution of the SDP relaxation.

18. The electronic device of claim 13, wherein the computing device is configured to:

extract a first feature point group from the first front image, extract a second feature point group from the second front image, calculate an essential matrix based on changes in the first feature point group and changes in the second feature point group, obtain a rotation matrix and a translation vector based on the essential matrix, and obtain the motion vector based on the rotation matrix and the translation vector.

19. The electronic device of claim 13, wherein the computing device is configured to:

convert the 3D coordinate values into world coordinates; and estimate one or more external parameters using a relationship between the world coordinates and the feature points, wherein the one or more external parameters include at least one of a roll angle, a pitch angle, a yaw angle, or a height of the camera.

20. The electronic device of claim 19, wherein the computing device is configured to estimate the one or more external parameters based on predefined vertical heights of the feature points in a world coordinate system, and based on differences between x-coordinates and y-coordinates of the world coordinates and x-coordinates and y-coordinates of the feature points being zero.

* * * * *